P. BERG.
THREADLESS HOSE COUPLING.
APPLICATION FILED JAN. 14, 1913.
1,080,674.
Patented Dec. 9, 1913.
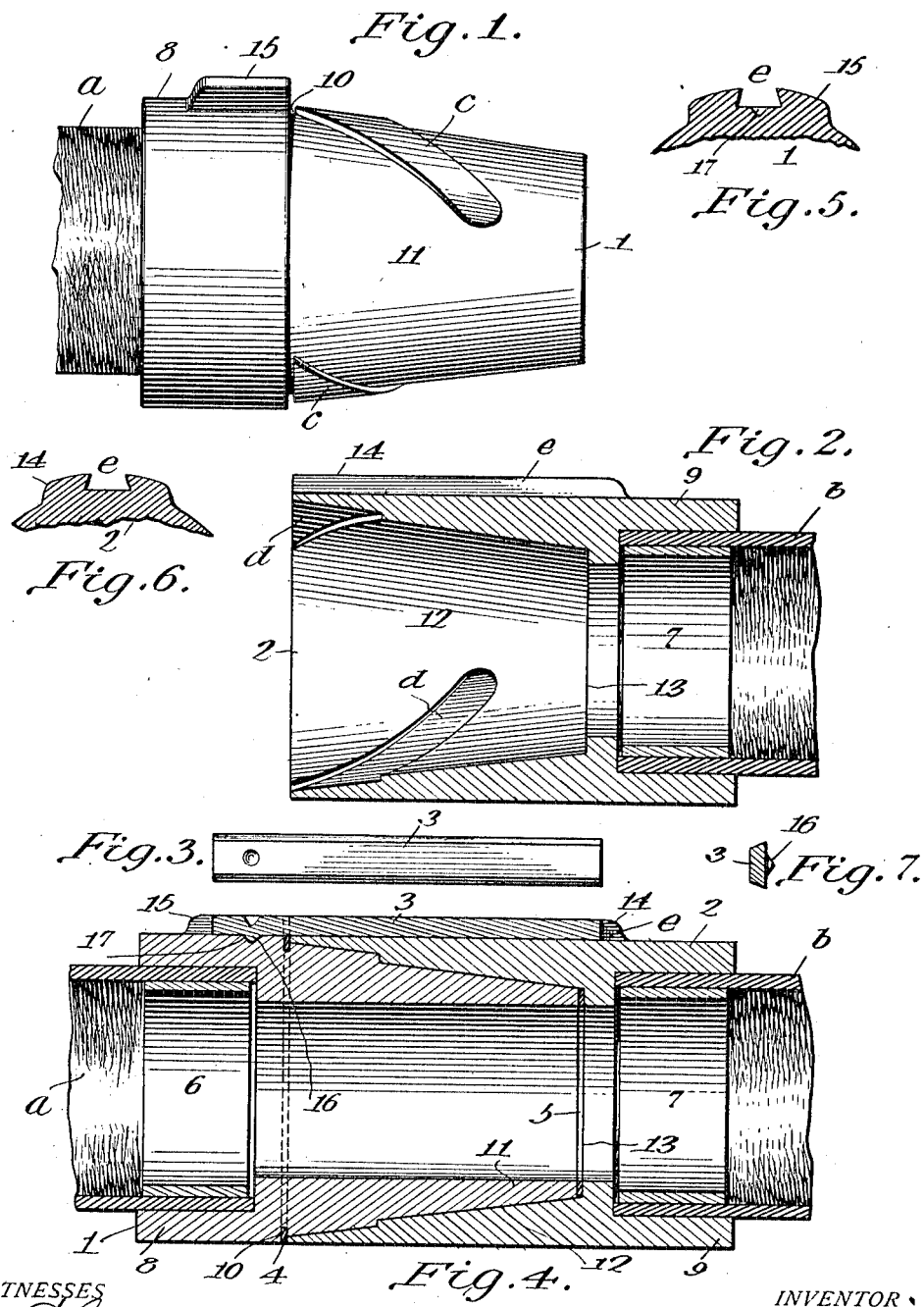

UNITED STATES PATENT OFFICE.

PETER BERG, OF ENDERLIN, NORTH DAKOTA.

THREADLESS HOSE-COUPLING.

1,080,674.   Specification of Letters Patent.   Patented Dec. 9, 1913.

Application filed January 14, 1913. Serial No. 741,926.

*To all whom it may concern:*

Be it known that I, PETER BERG, a citizen of the United States of America, and a resident of Enderlin, in the State of North Dakota, have invented a new and useful Improvement in Threadless Hose-Couplings, of which the following is a specification.

This invention relates to those couplings for flexible hose which are constructed without screw threads, and so as to be tightened or loosened by a part turn, and consequently more rapidly than screw couplings.

The present invention consists in certain novel combinations of parts, and in an improved threadless hose coupling embodying said combinations or either of them, as hereinafter particularly described and claimed.

The leading objects of this invention are to render such threadless hose couplings safe against liability to come apart accidentally, capable of being tightened both radially and longitudinally by a part turn, and at the same time simpler and easier to operate than heretofore.

Other objects will be set forth in the general description which follows.

A sheet of drawings accompanies this specification as part thereof.

Figure 1 is an elevation of one member of the improved threadless coupling attached to a hose section; Fig. 2 represents a longitudinal section through the other main member of the coupling attached to another hose section; Fig. 3 is an elevation of the locking key detached; Fig. 4 represents a longitudinal section through the whole; and Figs. 5, 6 and 7 are fragmentary sectional end views projected from Figs. 1, 2 and 3 respectively.

Like reference characters refer to like parts in all the figures.

The improved threadless hose coupling is composed of rotatable male and female members, 1 and 2, and a rotation resisting locking key, 3, of suitable metal, together with annular gaskets, 4 and 5, preferably two as shown, of suitable rubber or the like; the respective main members 1 and 2 being inseparably attached to hose ends $a$ and $b$ by expanded internal metallic rings 6 and 7, or in any known or improved manner.

The main members 1 and 2 are constructed in common with hose attaching ends, 8 and 9, adapted to coöperate with said internal rings 6 and 7, or their equivalents, respectively.

The male coupling member 1 has a gasket supporting shoulder, 10, adjoining said hose-attaching end 8, and a conical spigot end 11 provided with a plurality of quick-pitch spiral projections, $c$, preferably three in number, tapered as to radial thickness and having flat outer surfaces, the same extending from at or near said shoulder 10 toward the extremity of the spigot end a sufficient distance. The female coupling member 2 is correspondingly constructed with a conical socket, 12, fitted to said spigot end 11; spiral recesses $d$ fitted to and substantially coextensive with said spiral projections $c$; and a gasket-supporting shoulder, 13, at the smaller end of said socket.

The key 3 is a flat metallic bar having beveled retaining edges and of uniform or substantially uniform width, so as to be movable endwise to lock or unlock the coupling. It slides in an undercut key seat, $e$, parallel with the longitudinal axis of the coupling, and preferably formed by pairs of lugs 14 and 15 formed externally on the coupling members 2 and 1 respectively, and movable into alinement; the former being conveniently of sufficient length to retain the key in its retracted position. The key may be held in its effective position (Fig. 4) by friction or by any suitable detent. A simple form of such detent may consist of a conical projection, 16, on the key fitted to a matching depression, 17, between the lugs 15, the key 3 being sufficiently resilient.

The gaskets 4 and 5 are supported by said shoulders 10 and 13 respectively; the gasket 4 contacts with the opposing extremity of the member 2, and the gasket 5 with that of the member 1.

It will be obvious that one of the gaskets may be omitted by some makers; and other like modifications will suggest themselves to those skilled in the art.

Having thus described said improvement, I claim as my invention, and desire to patent under this specification:

1. A threadless hose coupling having, in combination, a male member constructed with a conical spigot end provided with a plurality of quick pitch spiral projections tapered as to radial thickness and having flat outer surfaces, a female member having a matching socket and provided with spiral recesses fitted to and substantially coextensive with said spiral projections, and a rotation resisting locking device.

2. An improved threadless hose coupling having, in combination, a male member constructed with a hose-attaching end, a conical spigot end and an interposed gasket-supporting shoulder, said spigot end being provided with a plurality of quick pitch spiral projections extending from said shoulder toward the extremity of the spigot; a female member constructed with a conical socket fitted to said spigot end, spiral recesses fitted to and substantially coextensive with said spiral projections and a hose-attaching end; a rotation resisting locking device and a gasket supported by said shoulder on the male member and contacting with the extremity of the female member.

3. An improved threadless hose coupling having, in combination, a male member constructed with a hose-attaching end, a conical spigot end and an interposed gasket-supporting shoulder, said spigot end being provided with a plurality of quick-pitch spiral projections extending from said shoulder toward the extremity of the spigot; a female member constructed with a conical socket fitted to said spigot end, spiral recesses fitted to and substantially coextensive with said spiral projections, a hose-attaching end and an interposed gasket supporting shoulder; a rotation resisting locking device; and gaskets supported by said shoulders and contacting with the extremities of said members respectively; substantially as hereinbefore specified.

PETER BERG.

Witnesses:
 THOMAS PIERCE,
 JAMES WALSH.

---

Copies of this patent may be obtained for five cents each, by addressing the "Commissioner of Patents, Washington, D. C."